United States Patent Office 2,742,129
Patented Apr. 17, 1956

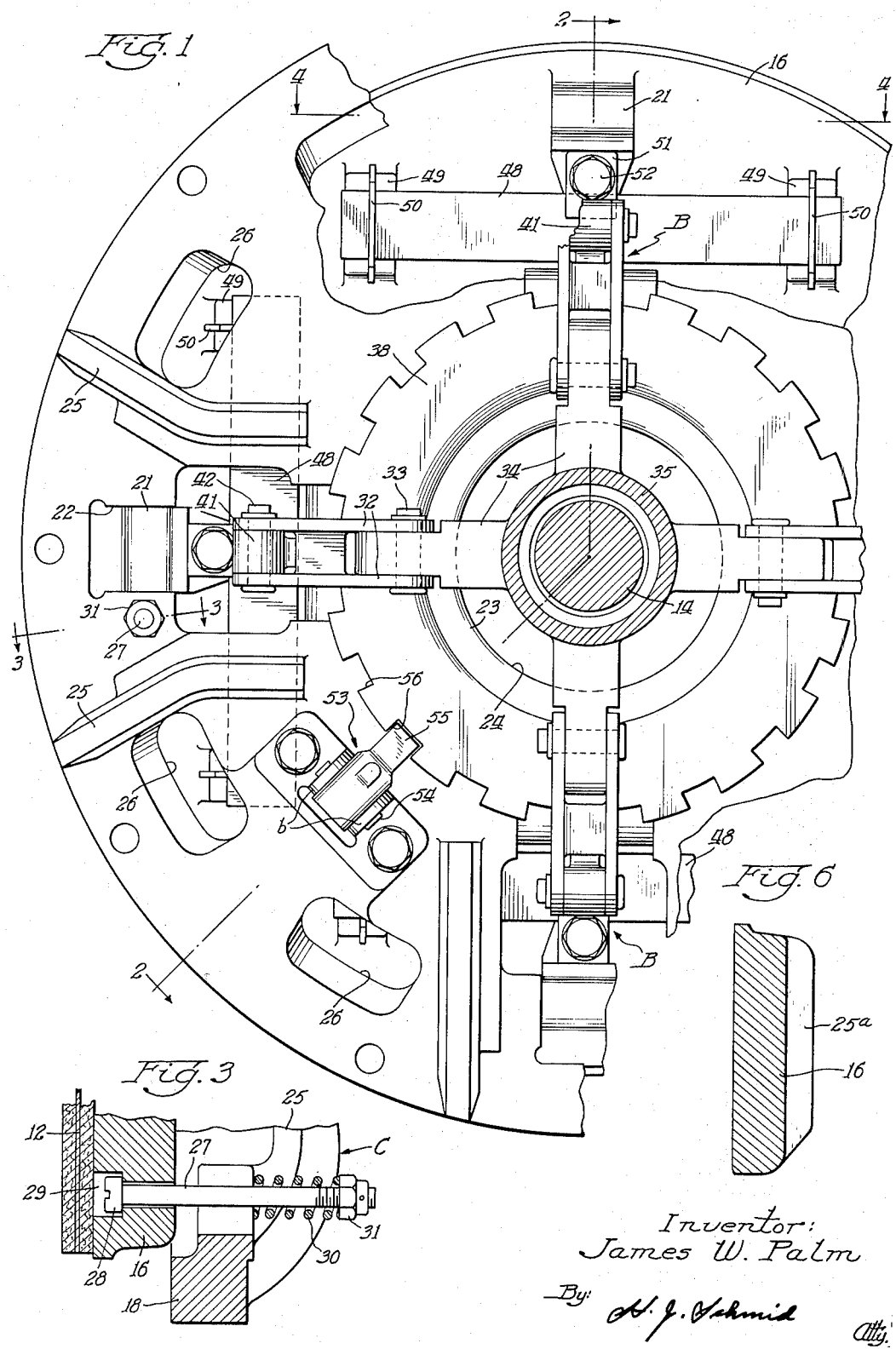

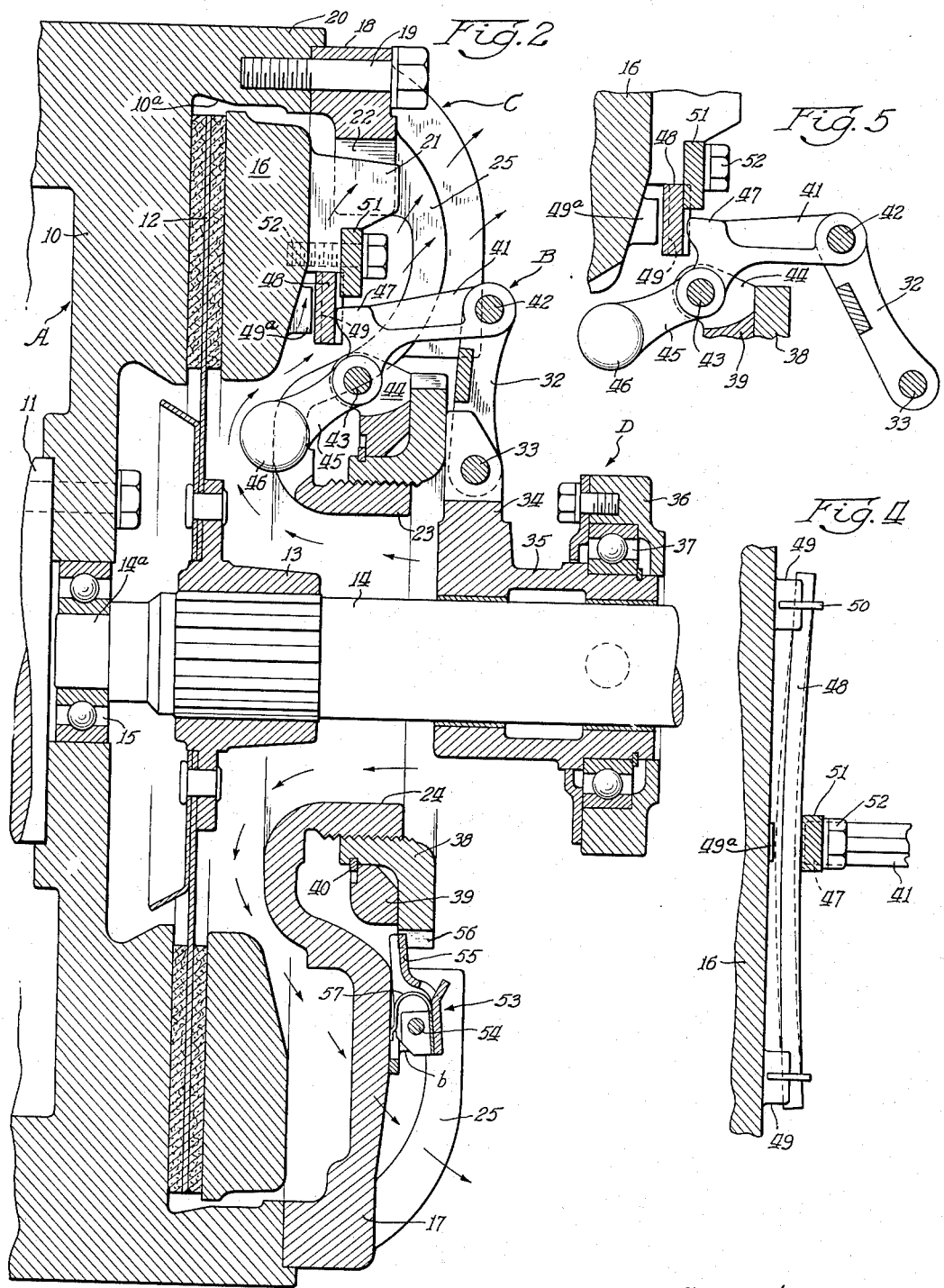

2,742,129

CLUTCH ASSEMBLY

James W. Palm, Rockford, Ill., assignor to Borg-Warner Corporation, Chicago, Ill., a corporation of Illinois Application May 12, 1951, Serial No. 226,069

14 Claims. (Cl. 192—89)

The present improvements relate generally to clutches and more particularly to clutches which are adapted for heavy duty where severe service is required.

Clutches of above-mentioned type are usually provided with overcenter actuating means and are installed in tractors and other heavy vehicles, such as earth moving machines and the like. During the use of these machines, there is frequent engagement and disengagement of the clutch while it is rotating at high speeds and this results in the generation of considerable heat in the clutch assembly. Heating of the parts is injurious to the clutch members because they tend to warp, and it has been found that some of the parts are damaged to such an extent that they require replacement which causes delay in completing the task being performed.

When overcenter engaging and disengaging mechanism is employed in these clutch assemblies, some of the component parts of the overcenter mechanism when rotating at high idling speeds and the clutch has been disengaged these overcenter parts frequently respond to centrifugal forces with the result that these parts tend to effect unintentional engagement of the clutch driving and driven plates.

It is desirable in clutches of this character to provide yieldable means between the pressure applying mechanism or toggle devices and the shiftable pressure plate so as to exert spring force against these toggle devices to hold them in overcenter position when the clutch has been engaged. The yieldable means preferably takes the form of a spring bar located between the pressure plate and the overcenter toggle mechanism, so that, when the friction surfaces of the clutch driving and driven members wear, the pressure plate is permitted to follow up with a sufficient amount of pressure supplied by the spring bar, and this pressure, in turn, is applied to the driven member to maintain the required amount of torque. By reason of the functioning of the spring bar, the adjustment periods of the clutch assembly are reduced to a minimum. There are several spring bars on the pressure plate, so that the follow-up travel of the pressure plate, which is produced by these spring bars, is approximately equal to the deflected length of the spring bars from their preloaded positions to their fully deflected positions. The spring means in the present assembly also performs the function of providing a yieldable force between the pressure plate and its shifting means for effecting a cushioned engagement of the clutch drive and driven members.

The present improvements have been carefully designed and have been successful in preventing the above-described objectionable conditions arising in a clutch assembly which is installed in a motor driven vehicle where severe service is encountered while performing heavy work.

Among the primary objects and attainments contemplated by the present improvements are the provision of (1) means for creating air currents within the clutch assembly and causing these currents to circulate through the clutch assembly to impinge upon the working parts whereby a considerable portion of the generated heat in the clutch members is dissipated, (2) means to automatically prevent the tendency of the overcenter clutch operating mechanism from unintentionally shifting at high idling speed from a position in which the clutch is disengaged to a position where said mechanism causes accidental clutch engagement; and (3) the employment of yieldable spring means, preferably in the form of a spring bar, which is acted on by the toggle devices for cushioning the engaging movement of the pressure plate against the clutch driven plate and also to assist in holding the toggle devices in overcenter positions while the clutch is engaged.

An object contemplated by the present improvements is to provide definite means on certain of the rotatable members of the clutch assembly for creating the flow of air currents which are drawn into the assembly through an axial opening in the backplate or housing and then be directed between said backplate and the shiftable pressure plate and other parts in radially outward paths so that the coolant air, after impinging upon the clutch parts, is discharged through an annular row of apertures in the backplate or housing. Specifically, this object is attained by providing a plurality of fins extending in generally radial directions on the inner surface of the backplate or housing of the assembly, or providing similar fins on the rear surface of the clutch pressure plate.

Another object contemplated by the present improvements resides in providing automatically operable means which are responsive to centrifugal forces, created at high idling speeds of the assembly when the clutch has been disengaged by the overcenter devices, said means being effective to overbalance a tendency of said overcenter devices, due to centrifugal forces acting thereon, to move out of a clutch disengaged position, into a position to engage the clutch. This arrangement is preferably a part of the toggle devices and when the clutch has been disengaged by said devices while the clutch is rotating at high idling speeds, said centrifugally responsive means is effective to overbalance centrifugal forces acting on the toggles and thereby maintain the clutch in disengaged position. The means for accomplishing this object comprises a weighted arm extending forwardly from the toggle device towards the pressure plate and is responsive to centrifugal forces to counteract the tendency of the toggle device to leave its clutch disengaged position.

The further object contemplated by the present mechanism resides in mounting a leaf spring bar at its end regions on supports on the rear face of the pressure plate and forcibly tensioning or bowing the midregion of this spring bar toward the pressure plate by means of a tensioning device which will lengthen the bar between its end supports. In this connection, the toggle devices are arranged to engage the spring bar at its bowed region so that the bar will be further elongated between its supports when the clutch driving and driven members are engaged. The yieldable action of the spring bar is also effective to maintain the toggle device in its overcenter position when the clutch parts have been drivingly engaged.

Additional objects, aims, and advantages of the improvements contemplated herein will be apparent to persons skilled in the art after the construction and operation of the present clutch assembly is understood from the within description. It is preferred to accomplish the foregoing and other objects, and to practice the invention in substantially the manner hereinafter fully described and as more particularly pointed out in the claims, reference being made to the accompanying drawings which form a part of this specification.

In the drawings:

Fig. 1 is vertical elevation showing a rear view of an overcenter heavy duty clutch assembly exemplifying the features contemplated by present improvements;

Fig. 2 is a transverse vertical section of the structure shown in Fig. 1, the view being taken along the plane of line 2—2 thereon;

Fig. 3 is a sectional view of a fragmentary portion of the clutch taken along the plane of line 3—3 on Fig. 1;

Fig. 4 is a schematic view showing details of the bowed spring bar and its manner of operation, the view being taken along the plane of line 4—4 on Fig. 1;

Fig. 5 is a fragmentary detail of the overcenter or toggle device in clutch disengaged position with respect to the pressure plate and the spring bar;

Fig. 6 shows a modified arrangement for creating coolant air currents.

The drawings are to be understood as being more or less of a diagrammatic character for the purpose of disclosing a typical or preferred form of the improvements contemplated herein, and in these drawings like reference characters identify the same parts in the different views.

Figs. 1 and 2 of the drawings exemplify a typical clutch assembly of the heavy duty type and show the present improvements incorporated therein. In these views, the flywheel assembly A comprises a flywheel 10 which is anchored in any suitable manner to the adjacent end of an engine drive shaft or crank shaft 11, and alongside the rear face of this flywheel there is a driven friction disc or plate 12 having a splined hub 13 for mounting the same for axial movement along the adjacent splined portion of the driven shaft 14. This driven shaft, as seen in Fig. 2, has a reduced end portion 14a which is piloted in antifriction bearings 15 carried by the flywheel, or the drive shaft, as may be desired. The friction disc or plate 12 is adapted to be drivingly engaged against the flywheel face through the medium of an annular pressure plate 16 that is shifted axially by an actuating assembly B which yieldably holds the pressure plate in clutch engaged position against said friction disc. The actuating assembly B has one portion in cooperative association with a backplate or housing assembly C, and it has a second portion which is operably connected to a shift bearing or thrust collar assembly D, the latter assembly being selectively moved manually in forward or rearward directions along the driven shaft 14 for the purpose of effecting the respective engagement or disengagement of the driven friction disc or plate 12 between the flywheel and the pressure plate at the option of the operator or driver of the tractor or other vehicle.

The backplate assembly C preferably takes the form of a housing 17 having an irregular contour in cross section with an outer peripheral flange 18 which is secured by cap screws 19 to an annular flange 20 extending rearwardly from the outer periphery of the flywheel. The flywheel flange 20 provides an annular recess 10a in the rear face of the flywheel so that the friction plate and pressure plate may be positioned in this recess forwardly of the backplate or housing and thereby reduce the overall axial dimension of the clutch assembly. The pressure plate 16 has a driving connection with the backplate or housing 17 through the instrumentality of rearward or axially extending lugs 20 which are engaged in recesses 22 in adjacent regions of the backplate, thus permitting the pressure plate, housing and flywheel to rotate in unison.

At the central region of the housing, there is an annular flange 23 of generally cylindrical shape which extends axially rearwardly to define a large axial opening 24. The cylindrical flange 23 surrounds the driven shaft 14 and is spaced a considerable distance radially from the said shaft to define an inlet opening for the ingress of extraneous coolant air into the housing when the clutch assembly is in rotation. For the purpose of drawing air into the housing through the opening 24 to impinge upon the clutch members, suitable fins 25 are provided which project forwardly from the inner surface of the housing, and said fins are of an elongate character and extend in generally radial directions on the housing between the axial opening 24 and the annular flange 18 at the outer periphery of the housing. Also, as shown in Fig. 6, fins 25a may be positioned upon the rear surface of the pressure plate which rotates with the backplate or housing, and will thus draw extraneous coolant air into the clutch assembly. Between the axial opening 24 and the outer peripheral flange 18, the housing has therein a plurality of openings 26, which are arranged in an annular row and are each elongated in a circumferential direction as seen in Fig. 1. This annular row of apertures 26, define egress or outlet means for discharging the coolant air after it has circulated within the housing and has impinged upon the clutch members in which heat has been generated during operation of the clutch. It will be understood that the coolant air is forcibly drawn into the clutch assembly by means of the fins which function as rotating fan blades, with the result that the temperature of the clutch parts is materially reduced and prevented from becoming overheated, particularly when the clutch is disengaged and may be idling at high speeds.

In addition to the driving lug connection between the pressure plate 16 and the housing or backplate, there are spring reaction connections between these members, each of which comprises a bolt 27 having its head 28 seated in recess 29 on the front face of the pressure plate and has its shank extended through the pressure plate and the housing 18 as shown in Fig. 3. A coiled expansion spring 30 surrounds the outer rearward portion of the bolt with one end engaged with the rear surface of the housing and the other end engaged with an adjusting nut 31 whereby the spring is held under tension. Thus it is apparent that the spring 30 assists in drawing the pressure plate away from the friction disc when the driving and driven members of the clutch have disengaged.

The actuating assemblies B operate to move the pressure plate in one axial direction into contact with the friction disc and press the latter into engagement with the adjacent flywheel face as shown in Fig. 2, and these actuating assemblies when moved in another direction become effective to release the clutch in the manner shown in Fig. 5. Since all of the assemblies B are identical, one description thereof will suffice. The assembly preferably takes the form of a toggle which comprises the Siamese links 32 which are arranged in a generally upstanding position and are pivotally connected at their lower regions by a pin 33 to an annular boss 34 formed as a part of the shift bearing or thrust collar assembly D. Fig. 2 shows the assembly D as comprising an axially elongate sleeve 35 on driven shaft 14 with an annular boss 34 at its forward end and having a collar 36 surrounding its rear region with antifriction bearings 37 interposed between said sleeve and collar. The usual shift fork (not shown) engages the collar 36 for moving the thrust bearing assembly D longitudinally on the driven shaft 14 to operate the toggle of the clutch actuating assembly D. The outer surface of the annular axial flange 23 of the housing is threaded to receive a take-up ring 38 of L-shape in cross section which is similarly threaded on the inner surface of its axial flange, whereby the ring 38 may be rotatably adjusted on its support. Mounted in the angle formed by the L-shaped flanges of the ring, there is an annulus 39 which is arranged with one face abutting the radial flange of the ring and is held in place by a spring snap ring device 40 which contacts the opposite face of said annulus. The second member of the overcenter toggle comprises an arm 41 extending in a generally horizontal direction with its rearward end coupled to the adjacent end of the Siamese links 32 by a pin 42, and the forward end of link 41 is pivotally connected to the annulus by a pin 43 extending between a pair of ears 44 on the annulus. A second arm 45 extends forwardly of the pin 43 towards the pressure plate 16 and is provided with a weight 46 on its free end so that the arm 45 is responsive to centrifugal forces created by the rotation of the clutch assembly.

In operation, when the shift collar assembly D is moved to the right from the position shown in Fig. 2, the actuating assembly assumes the position shown in Fig. 5 so that the toggle, comprising links 32 and arm 41, assume a somewhat flattened position and the clutch is disengaged. In the event the clutch may be rotating at high idling speeds, the knuckle portion of the toggle device at the pin 42 has the tendency to move radially outward to a position where the arrangement is likely to effect unintentional clutch engagement or at least move the clutch members close enough to each other as to create a drag on the friction members. This tendency of the toggle to unintentionally engage the clutch parts is definitely avoided by reason of the fact that the weighted arm 45 overbalances the centrifugal forces which have been exerted on the toggle.

The connection between the pressure plate 16 and the toggle assembly B preferably takes the form of a cam member 47 on the hub region of the arm 41 adjacent the pivot pin 43 and is arranged with its toe projecting toward the pressure plate. In view of the fact that heavy duty friction discs are of a simplified type without cushioning means between the facings and the intermediate plate thereof, it is desirable, though not essential, to provide means for cushioning clutch packing pressure when the clutch is being engaged. In the present arrangement, a cushioning effect is acquired by providing spring means between the pressure plate and the toggle, said means being preferably in the form of a spring metal bar 48. This spring bar 48, as shown on Fig. 1, is of elongate form and is mounted at its end regions on supports 49 on the rear of the pressure plate so that said spring bar extends in a direction generally transverse to the plane of the toggle assembly B. Suitable clips 50 hold the bar on its supports and said bar is forcibly held in a bowed state between its ends by means of a heavy retainer member or bracket member 51, which is anchored to the pressure plate by a cap screw 52. The supports 49 at the ends of the spring bars 48 are located on the mean radius of the rear face of the pressure plate, which is between the inner and outer peripheries of said plate, so that even pressure is produced on the friction surfaces of the driven disc member. Thus distorted or uneven conditions are prevented on the surfaces when there is wear on the driving and driven members of the assembly. The spring bars are deflected to stops 49a on the rear surface of the pressure plate intermediate the supports 49, and these stops allow the clutch to be adjusted beyond its rated torque capacity without injury to the spring bars. After an overload of pressure, that has been applied to the pressure plate, is decreased and is equal to the pressure produced by the fully deflected spring bars, the pressure of the fully deflected spring bars is applied to the driven disc member. The initial amount of deflection of the spring bar is not sufficient to produce any appreciable amount of pressure required to operate the clutch to its torque capacity. Therefore, the spring bar is preloaded or "trapped" at a specific height, and it is from this preloaded height position to the fully deflected position of the spring bar that sufficient pressure is produced to operate the clutch at its specified torque. The "trapped" or preloaded condition of the spring bar eliminates the requirement of having a larger release sleeve travel to obtain ample pressure plate release travel.

The bowed midregion of the spring bar 48 is adapted to be engaged by the toe of cam 47 during the operation of engaging the clutch members. When the thrust collar is moved in a forward direction (to the left in Fig. 2) the cam 47 will increase the bow of the spring bar 48 and thereby the spring bar is lengthened between its supports. This is schematically shown in detail in Fig. 4 wherein it is to be noted that the full lines show the spring bar 48 in its normal bowed state, and the dotted lines show bowed effect resulting from the engagement of the cam 47 with the midregion of said bar. When the clutch is in engaged position, the toggle is in overcenter position as in Fig. 2, so that the spring tension of the bar 48 is exerted against the cam 47 and tends to swing the knuckle portion of the toggle in a downward direction to effectively maintain the toggle against any flattening movement thereof. In other words, the spring bar 48 is capable of performing the above-described dual functions. Furthermore, when the toggle assembly B is moved towards either clutch engaged or disengaged position, the toggle assembly will pass from one side to the other of the overcenter position with a snap action, and this overcenter snapping action is effectively cushioned by the spring bar.

As previously explained, the take-up ring 38 is screwed on the exterior surface of the flange 23, and since the toggle arrangement is carried by this take-up ring through the medium of the annulus 39, said ring may be rotated in one direction or the other to bodily move the assembly toward or away from the pressure plate 16 as desired. The take-up ring is locked in its selected positions by means of a latch assembly 53 that is hingedly mounted between ears b on a rear portion of the housing by means of a pivot 54 and is provided with an arm 55 projecting radially inward to engage in one of the notches 56 made in the edge or outer periphery of the take-up ring 38. A spring 57 of approximately U-shape is effective to hold the latch device in its engaged position with respect to the notches 56.

From the foregoing description it is apparent that the arms 41 and 45 define a rock lever or bell-crank member which is fulcrumed intermediate its ends on the pivot pin 43, and also that the cam member 47 provides what may be termed a third or auxiliary arm of the bell-crank. When cam 47 acts upon the spring bar 48, there is a cushioning of the force which is being applied to the pressure plate by the toggle device during movement of the clutch members into clutch engaged positions. This spring bar is effective to assist in holding the toggle members in overcenter positions during clutch engagement. Also certain portions of the clutch assembly have air circulating fins which produce air currents to reduce the temperature of the working parts of the clutch.

While the present structure has been described in detail in a typical or preferred form or embodiment, it will be apparent to persons skilled in the art, after understanding the construction and operation of the improvements contemplated herein that various changes and modifications thereof may be made without departing from the spirit or scope thereof. It is contemplated in the appended claims to cover all such changes and modifications.

What is claimed is:

1. A clutch assembly comprising a driving member; an axially shiftable pressure plate; clutch operating lever means pivotally carried by said driving member; means for applying pressure to said lever means to effect clutch engagement; circumferentially spaced supports on the rear face of said pressure plate; and a spring metal bar carried at its ends by said supports in spaced relation to said pressure plate and forcibly held in a bowed condition respecting said pressure plate, said bar being engageable adjacent its mid-region by said lever means to increase the length of said bar between said supports thereby to impart clutch engaging pressure to said pressure plate.

2. A clutch assembly comprising a driving member; an axially shiftable pressure plate member; clutch lever means pivotally carried by said driving member; means for applying pressure to said lever means to effect clutch engagement; a spring metal bar arranged parallel to a plane tangent to said pressure plate member and supported adjacent its ends in spaced relation to said pressure plate member; and means engaged with the mid-region of said bar in constantly preloaded condition for forcibly bowing said bar towards said pressure plate member, said preloaded bowed region of said bar being engaged by said lever means to increase its length between its supports and thereby impart yielding clutch engaging pressure to said pressure plate member.

3. A clutch comprising a rotatable driving member; a shiftable pressure plate member rotatable with said driving member; a driven clutch plate arranged for frictional engagement between said members; a back plate carried by said driving member and having a portion rearward of said pressure plate member; clutch operating lever means pivotally mounted on said back plate for shifting said pressure plate member; means for applying clutch packing pressure to said lever means for axially moving said pressure plate member to effect clutch engagement; and an elongate straight metal bar supported at its end regions in spaced relation to said pressure plate member and having a region intermediate its ends constantly bowed with respect to said pressure plate member, said bar engaged at its bowed region by said lever means and being effective upon application of pressure by said lever means to reduce the radius of the arc of said bowed region of the bar and cause frictional engagement of said driven clutch plate by said members.

4. A clutch comprising a rotatable driving member; a shiftable pressure plate member rotatable with said driving member; a driven clutch plate arranged for frictional engagement between said members; a back plate rearward of said pressure plate member and carried by said driving member; clutch operating lever means pivotally mounted on said back plate for operating said pressure plate member; means for applying clutch packing pressure to said lever means for shifting said pressure plate member to effect clutch engagement; an elongate leaf spring supported at its end regions on said pressure plate member in spaced relation thereto; and means engaged with said spring intermediate the ends thereof for holding said spring in a constantly bowed condition with respect to said pressure plate member, said lever means engaging the bowed region of said spring and being effective to vary the radius of the arc of said bowed region and engage said clutch upon application of pressure by said lever means.

5. A clutch comprising a rotatable driving member; a shiftable pressure plate member rotatable with said driving member; a driven clutch plate arranged for frictional engagement between said members; clutch operating cam means pivotally supported by said driving member; means for applying clutch packing pressure to said cam means for shifting said pressure plate member to effect clutch engagement; an elongate yieldable metal bar supported at its end regions in spaced relation to said pressure plate member; and restraining means engaged with the intermediate region of said bar for constantly holding said bar in a condition bowed towards said pressure plate member, said cam means engaging said bowed region of said bar and being effective upon application of pressure to said cam means to effect further bowing of said bar towards said pressure plate member.

6. A clutch assembly comprising a rotatable driving member; an axially shiftable pressure plate member rotatable with said driving member; a driven clutch plate arranged for frictional engagement between said members; a back plate carried by driving member; a rock lever pivoted intermediate its ends on said back plate and having forward and rearward extending arms; means for applying clutch packing pressure to the rearward extending arm of said rock lever; and a yieldable metal bar supported at its end regions in spaced relation to said pressure plate member and having a region intermediate its ends constantly maintained in bowed condition with respect to said pressure plate member, said bar being engaged at said bowed region by the forward extending arm of said rock lever and being operable upon application of pressure by the rearward extending arm of said rock lever to elongate the portion of the bar between its supports thereby to reduce the radius of curvature of said bowed region and effect frictional engagement of said driven clutch plate between said members.

7. A clutch assembly comprising a rotatable driving member; an axially shiftable pressure plate member rotatable with said driving member; a driven clutch plate arranged for frictional engagement between said members; a back plate carried by said driving member; an axially movable pressure exerting member rearward of said back plate; an overcenter toggle device carried by said back plate, a first portion of said toggle device extending towards said pressure plate member, and a second portion of said toggle device having operative connection with said pressure exerting member; and a spring metal bar supported at its end regions on said pressure plate member in spaced relation thereto and having a region intermediate its ends which is characterized by a preloaded bow extending towards said pressure plate member, said bar being engaged at said bowed region by said first portion of the toggle device, and being effective upon application of pressure by said movable pressure exerting member to alter the radius of curvature of said bowed region and thereby frictionally engage said driven clutch plate between said driving and pressure plate members.

8. A clutch comprising a rotatable driving member; an axially shiftable pressure plate member rotatable with said driving member; a driven clutch plate arranged for frictional engagement between said members; a back plate carried by driving member; a rock lever pivoted intermediate its ends on said back plate and having forward and rearward extending arms; means for applying clutch packing pressure to the rearward extending arm of said rock lever; and a metal bar supported at its end regions on said pressure plate member in spaced relation thereto and having a region intermediate its ends preloaded in a bowed condition with respect to said pressure plate member, said bar being engaged at said bowed region by the forward extending arm of said rock lever and being operable upon application of pressure by the rearward extending arm of said rock lever to reduce the radius of curvature of said bowed region and effect frictional engagement of said driven clutch plate by said members.

9. In a clutch assembly which comprises a rotatable driving member; an axially shiftable pressure plate rotatable with said driving member; a driven clutch plate arranged for frictional engagement between said driving member and pressure plate; a back plate carried by driving member; and an axially shiftable member rearward of said back plate; those improvements which comprise a spring metal bar supported at its end regions on said pressure plate and being pretensioned in a bow which extends toward said pressure plate in non-contacting relation thereto; means for forcibly holding said spring bar in its pretensioned bowed condition; a rock lever fulcrumed intermediate its ends on said back plate; and a link operatively connecting said rock lever to said axially shiftable member, said rock lever and said link defining an overcenter toggle device; a first arm of said rock lever having a cam portion engageable with the bowed region of said spring metal bar, and a second arm of said rock lever having a weight at its end remote to the lever fulcrum for imparting centrifugal forces to the rock lever, said first arm and said link at high idling speed having a tendency in response to centrifugal forces to assume a position to engage the clutch assembly, and said weight in response to centrifugal forces being effective to overbalance said tendency and to maintain said first arm and said link in clutch disengaging position.

10. A clutch comprising a rotatable driving member; a shiftable pressure plate member rotatable with said driving member; a driven clutch plate arranged for frictional engagement between said members; a back plate carried by said driving member and having a portion rearward of said pressure plate member; a plurality of overcenter toggle devices pivotally mounted on said back plate and being operable to shift said pressure plate member into clutch engaged position; means for moving said toggle devices to forward and rearward overcenter positions during which snap actions occur when passing dead center; and elongate spring metal yieldable bars supported at their end regions on said pressure plate member in spaced relation thereto and pretensioned toward said pressure plate member, said pretensioned spring bars being engageable intermediate their ends by said toggle devices, said spring bars being effective to cushion the aforesaid snap actions of said toggle devices when said devices move past their respective dead centers.

11. A clutch comprising axially spaced rotatable driving members, one of which defines a shiftable pressure plate; a driven clutch plate arranged for frictional engagement between said members; a back plate rotatable with said driving members; an overcenter toggle device pivotally mounted on said back plate for shifting said pressure plate, said toggle device being movable past its dead center by a snap action; and an elongate spring metal bar supported at its end regions in spaced relation to said pressure plate and being pretensioned in a bow toward said pressure plate, said spring bar being engaged at its mid-region by an adjacent member of said toggle device to effect further bowing of said spring bar, said spring bar imparting a cushioning effect to the aforesaid snap action of the toggle during operation of the latter.

12. A clutch comprising driving and driven members, said driven member being defined by an axially shiftable annular pressure plate; a spring metal bar supported adjacent its end regions at the mean radius of said pressure plate between the inner and outer peripheries thereof, said spring bar being preloaded in a bow extending toward said pressure plate in an arc having a predetermined selected radius; clutch operating lever means pivotally carried by said driving member and being operable to engage the mid-region of said spring bar and force it toward said pressure plate thereby to reduce the radius of the arc of the bowed region and increase the lenght of the spring bar between its said supports; and means for applying pressure to said lever means to effect the aforesaid operation thereof and the engagement of said clutch members.

13. A clutch comprising driving and driven members, said driven member being defined by an axially shiftable annular pressure plate; spaced supports on said pressure plate at the mean radius thereof between the inner and outer peripheries thereof; a spring metal bar carried by said supports and being preloaded in a bow extending toward said pressure plate in an arc having a predetermined radius; a clutch operating lever on said driving member and being operable to engage the mid-region of said spring bar and force it toward said pressure plate thereby to reduce the radius of the arc of the bowed region and increase the length of the spring bar between its said supports; and means for applying pressure to said lever means to effect the aforesaid operation thereof to engage said clutch members.

14. A clutch comprising driving and driven members, said driven member being defined by an axially shiftable annular pressure plate; spaced supports on said pressure plate at the mean radius thereof between the inner and outer peripheries; a spring metal bar carried at its ends by said supports in spaced relation to said pressure plate; means on said pressure plate engaged with said spring bar intermediate its ends for preloading said bar in a bow extending toward said pressure plate in an arc of predetermined radius; a clutch actuating lever on said driving member and operable against the mid-region of said spring bar to force said region toward said pressure plate thereby to reduce the radius of the arc and increase the length of the spring bar between its said supports; and means for applying pressure to said lever to effect the aforesaid operation thereof to engage said clutch members.

References Cited in the file of this patent

UNITED STATES PATENTS

| | | |
|---|---|---|
| 1,411,110 | Livermore | Mar. 28, 1922 |
| 1,475,909 | Wasserman | Nov. 27, 1923 |
| 1,572,370 | Smith | Feb. 9, 1926 |
| 1,913,944 | Morin | June 13, 1933 |
| 1,915,732 | Goldschmidt | June 27, 1933 |
| 2,115,763 | Burke | May 3, 1938 |
| 2,251,366 | Miller et al. | Aug. 5, 1941 |
| 2,300,187 | Wemp | Oct. 27, 1942 |
| 2,348,025 | Peets et al. | May 2, 1944 |
| 2,370,360 | McLean et al. | Feb. 27, 1945 |
| 2,523,501 | Davies et al. | Sept. 26, 1950 |